United States Patent
Adams et al.

(10) Patent No.: US 12,508,737 B2
(45) Date of Patent: Dec. 30, 2025

(54) WOOD COMPOSITES AND PROCESSES TO MODIFY SAME USING STABLE, LOW PH AQUEOUS SILICATE SUSPENSIONS

(71) Applicant: T2EARTH HOLDINGS LLC, Jericho, NY (US)

(72) Inventors: Sara Nicole Adams, Augusta, GA (US); Edward John Fewkes, Jr., Modoc, SC (US); Andrew Kegan Lyon, Evans, GA (US); Jeffrey F. Taylor, Evans, GA (US)

(73) Assignee: T2EARTH HOLDINGS LLC, Jericho, NY (US)

( * ) Notice: Subject to any disclaimer, the term of this patent is extended or adjusted under 35 U.S.C. 154(b) by 0 days.

(21) Appl. No.: 19/055,920

(22) Filed: Feb. 18, 2025

(65) Prior Publication Data
US 2025/0187226 A1     Jun. 12, 2025

Related U.S. Application Data

(63) Continuation of application No. PCT/US2024/056812, filed on Nov. 21, 2024.
(Continued)

(51) Int. Cl.
    *B27K 3/20*     (2006.01)
    *B27K 3/08*     (2006.01)

(52) U.S. Cl.
    CPC .............. *B27K 3/20* (2013.01); *B27K 3/08* (2013.01); *B27K 2240/20* (2013.01); *B27K 2240/30* (2013.01); *B27K 2240/70* (2013.01)

(58) Field of Classification Search
None
See application file for complete search history.

(56) References Cited

U.S. PATENT DOCUMENTS 961,123 A  \*   6/1910   Hall ...................... D06P 1/6426
                                                                             8/518
1,076,553 A     10/1913   Dautreppe
(Continued)

FOREIGN PATENT DOCUMENTS

WO     2012153183     11/2012

OTHER PUBLICATIONS

Search Report and Written Opinion of the International Searching Authority dated Jan. 23, 2025 issued in the corresponding PCT Application.

*Primary Examiner* — Chinessa T. Golden
(74) *Attorney, Agent, or Firm* — COZEN O'CONNOR

(57) ABSTRACT

A stable, low pH aqueous silicate suspension is disclosed for modifying wood article(s). The suspension includes: a metal silicate having a solution concentration of from 1.5 wt % to 52 wt % and characterized by a modulus of from about 1.8 to about 4.0; at least one of a protic acid solution and a buffering acid solution in an amount effective to acidify the metal silicate to a pH of 3.0 or less, preferably to a pH between 1.0 and 3.0; and a multivalent metal salt having a solution concentration from 5 wt % to 25 wt %. The suspension has a pH of 3.0 or less. Wood articles impregnated with the suspension and processes for modifying wood articles with the suspension are also disclosed. The stable, low pH aqueous silicate suspensions provide for an increased depth of impregnation into wood articles as compared with conventional silicate treatments.

14 Claims, 4 Drawing Sheets

Related U.S. Application Data

(60) Provisional application No. 63/601,941, filed on Nov. 22, 2023.

(56) References Cited

U.S. PATENT DOCUMENTS

| | | |
|---|---|---|
| 6,303,234 B1 | 10/2001 | Slimak et al. |
| 6,827,984 B2 | 12/2004 | Slimak et al. |
| 9,415,526 B2 | 8/2016 | Hellberg |
| 2005/0042377 A1 | 2/2005 | Slimak et al. |
| 2011/0011304 A1* | 1/2011 | Sunden ................ C01B 33/20 |
| | | 106/18.34 |
| 2013/0244049 A1 | 9/2013 | Hellberg et al. |
| 2015/0352744 A1 | 12/2015 | Zhang et al. |

* cited by examiner

WOOD COMPOSITES AND PROCESSES TO MODIFY SAME USING STABLE, LOW PH AQUEOUS SILICATE SUSPENSIONS

PRIORITY CLAIM

This application is a continuation of International Phase patent application No. PCT/US2024/056812 which was filed with the U.S. Patent and Trademark Office on Nov. 21, 2024. This application claims the benefit of U.S. Provisional Application No. 63/601,941, filed on Nov. 22, 2023, which is herein incorporated by reference in its entirety.

TECHNICAL FIELD OF THE INVENTION

This invention generally relates to the field of silicate impregnated wood articles and processes for making same. The disclosed stable, low pH aqueous silicate suspensions delay gelling to provide greater depths of penetration of the silicate into the wood.

BACKGROUND

Lumber has long been treated to improve characteristics and lengthen lifecycle, with varying degrees of success. Treated wood is typically referred to as wood that has been treated with preservative chemicals. A typical treatment method would include impregnating the wood product with treatment chemicals that can result in wood product that is fire resistant, mold resistant, and insect resistant. Many different chemicals have been used for these purposes, Metal silicates (e.g., Na, K, Li and related silicates) to improve wood flame retardation, insect attack, and microbial attack were described as early as 1835, (see e.g., Nepomuk von Fuchs, Johann "On a new product from silica and potash". Archiv für die Gesammte Naturlehre, 1825, 5 (4), 385-412. Silicate solutions were known to be soluble in basic solutions with a pH between 10-12 (see e.g., J. G. Vail in "Soluble Silicates" Reinhold Publishing Corp., NY, NY $3^{rd}$ Printing, 1960 pg. 118-135). Under these basic (high pH) conditions, the silicate is in the chemical state of a deprotonated silicate and quite stable to gelation. Left uncured, silicate salts may be prone to water absorption and in extreme cases dissolution as they remain as water soluble salts. Referring to U.S. Pat. Nos. 6,303,234 and 6,827,984, extreme conditions of heat and moisture could result in wood degradation and thus the wood composite is constrained to interior applications Multiple ways of reducing the water solubility of metal silicates have been described. One approach is to use heat as disclosed in U.S. Pat. No. 6,303,234, where the silicate becomes less soluble with increasing temperature.

Another approach is to react the oxide ion of the deprotonated silicate with an electrophilic element or molecule. One way to accomplish this is to react the oxide ion by addition of a protic acid as in U.S. Pat. No. 1,076,553 "Process for Impregnating Wood" where carbon dioxide is dissolved in water to generate carbonic acid which protonates the silicate salt in solution to form an insoluble gel. The process of forming an insoluble gel is referred to as curing of the silicate and is due to a hydrogen bonded network formed after the protonation. The increased association of the individual protonated molecules increases the effective size of the molecule, thus rendering it insoluble.

Another example of the use of a mineral protic acid where the precipitate (polysilicic acid) is further reported to be not only less soluble, but also to show resistance to fungal attack (see e.g., Chen, G., "Treatment of Wood with Polysilicic Acid Derived from Sodium Silicate for Fungal Protection" *Wood and Fiber Science*, 2009, 41 (3), 220-228). A surface coating formulation as in U.S. Pat. No. 9,415,526 B2, organic acids, e.g., citric acid, and mineral acids, e.g., phosphoric acid, discloses concentrations below that which would cause gelation to allow for longer storage times for the coating.

U.S. Pat. No. 9,415,526 B2 discloses coatings that employ multi-valent salts, e.g., $Ca^{+2}$, $Fe^{+2}$, $Fe^{+3}$, $Mg^{+2}$, alone or in combination with protic salts to cause silicate precipitation. Such in-solubilization agents were added below the amount needed to cause gelation.

U.S. Pat. Nos. 1,076,553; 6,303,234; and 6,287,984 disclose the use of vacuum pressure impregnation into wood articles. While impregnation into the wood aids in resistance to flame, microbial, fungal and insect resistance, challenges to uniformity arise due to the wide variation of wood morphology.

Despite silicate salts being used for many years to treat wooden articles, it remains a problem to be solved to reproducibly modify wood to attain desired moisture resistance as well as resistance to flame, microbial, fungal and insect resistance. In particular, there remains a need to develop suspensions and processes for impregnating to penetrate dense and/or hard-to-impregnate wood materials to improve moisture, antimicrobial, and fungal resistance. The disclosure herein describes a synergistic combination of components to provide a delayed gelling silicate suspension, which in turn provides the sought after penetration into dense and/or hard-to-impregnate wood materials to improve moisture resistance, suitable for modifying wood for not only indoor use but also for outdoor use weathering environmental elements.

SUMMARY OF THE INVENTION

The present disclosure is directed to stable, low pH aqueous silicate suspensions for modifying wood articles, to wood articles including solid impregnates, and also to processes for preparing the suspension and for modifying wood articles with the suspension. The synergistic combination of aqueous components in the stable, low pH aqueous silicate suspension include a metal silicate, a protic acid and/or buffering acid, and a multivalent metal salt. This suspension provides for an unexpectedly delayed gelation (precipitation) of the silicate and surprising stability. This allows the suspension to penetrate deeper into wood articles, forming a solid impregnate therein.

The degree of aggregation of the silicate impacts the suspension's ability to flow through the narrow channels, pores, and/or vessels in a wood article. The stable, low pH aqueous silicate suspension herein demonstrates colloidal properties. By impregnating the wood article with the suspension at low pH, e.g., less than pH 3, the suspension behaves akin to a solution of monomeric silicic acid molecules. Thus, problematic aggregation is reduced or eliminated, allowing the suspension to impregnate the wooden article to a greater depth of impregnation as compared to conventional (high pH) silicate treatments for wood. The modified wood herein exhibits an interconnected, solid impregnate formed from the deep penetration of larger silicate structures that penetrate the wood article and precipitate out as silicates.

Disclosed herein is a stable, low pH aqueous silicate suspension for impregnating a wood article, the suspension including: (i) a metal silicate having a solution concentration of from about 1.5 wt % to about 52 wt % and characterized by a modulus of from about 1.8 to about 4.0; (ii) at least one of a protic acid solution and a buffering acid solution in an amount effective to acidify the metal silicate to a pH of about 3.0 or less, preferably to a pH between about 1.0 and about 3.0; and (iii) a multivalent metal salt having a solution concentration from about 5 wt % to about 30 wt %; wherein the suspension has a pH of about 3.0 or less.

In one aspect there is provided a suspension, wherein the metal silicate has a solution concentration of from about 12 wt % to about 40 wt %.

In one aspect there is provided a suspension, wherein the multivalent metal salt has a solution concentration from about 15 wt % to about 30 wt %.

In one aspect there is provided a wood article impregnated with a suspension as described in any of the paragraphs above and having a depth of impregnation greater than that of a comparative wood article impregnated with (i) alone, the depth of impregnation determined by X-ray fluorescence measurement of silicon based on a Forstner bit method, American Wood Protection Association Method A-51-1.

In one aspect there is provided a modified wood composite including: a wood article having a plurality of interconnected pores and an outer surface; an interconnected solid extending radially inward from the outer surface to a first distance, wherein the interconnected solid comprises a plurality of precipitated silicate particles at least partially impregnated within the plurality of interconnected pores; and wherein the interconnected solid is formed by impregnating the wood article with the stable, low pH aqueous silicate suspension as described in any of the paragraphs above, and wherein the first distance is greater than that of a comparative wood article impregnated with (i) alone.

In one aspect there is provided a modified wood composite further including the interconnected solid enveloping the outer surface.

In one aspect there is provided a process for modifying a wood article, the process including: applying a vacuum to a wood article within a reactor to obtain a vacuum of about 1000 Pa to about 4000 Pa followed by removing the vacuum; feeding the reactor with the stable, low pH aqueous silicate suspension (as described in any of the paragraphs above) maintained at a temperature from about 20° C. to about 90° C.; applying a first pressure from about 276 kPa to about 1379 kPa for about 15 minutes to 300 minutes to form a low pH modified wood article penetrated to a first depth with the stable, low pH aqueous silicate suspension to form an impregnate to a first depth of impregnation from an outer surface of the wood article, wherein the impregnate is solid.

In one aspect there is provided a process further including draining the reactor and/or drying the modified wood article at a temperature from about 30° C. to about 90° C. to form a dried low pH modified wood article.

In one aspect there is provided a process further including draining the reactor followed by introducing a mild base to raise the pH of the impregnate to a pH between about 6.0 and about 8.0, preferably to a pH between about 7.0 and about 8.0.

In one aspect there is provided a process further including a second feeding step to form a second impregnate, wherein the second impregnate is formed from a high pH metal silicate suspension including a metal silicate having a solution concentration of about 5 wt % to about 40 wt % and a modulus of from about 2 to about 4.

In one aspect there is provided a process, wherein the high pH metal silicate suspension has a pH of from about pH 10 to about pH 11.

In one aspect there is provided a process further including exposing the low pH modified wood article to a protic acid, a Lewis acid, a multivalent metal salt, solutions thereof, and/or combinations thereof, wherein exposing includes at least one of: the protic acid or solution thereof, wherein the protic acid is selected from sulfuric acid, acetic acid, phosphoric acid, hydrochloric acid, and combinations thereof; the Lewis acid or solution thereof, wherein the Lewis acid is selected from zinc chloride, magnesium sulfate, calcium chloride, and combinations thereof; and the multivalent metal salt or solution thereof, wherein the multivalent metal salt is aluminum sulfate.

DETAILED DESCRIPTION OF THE DISCLOSED EMBODIMENTS

Figure 1:
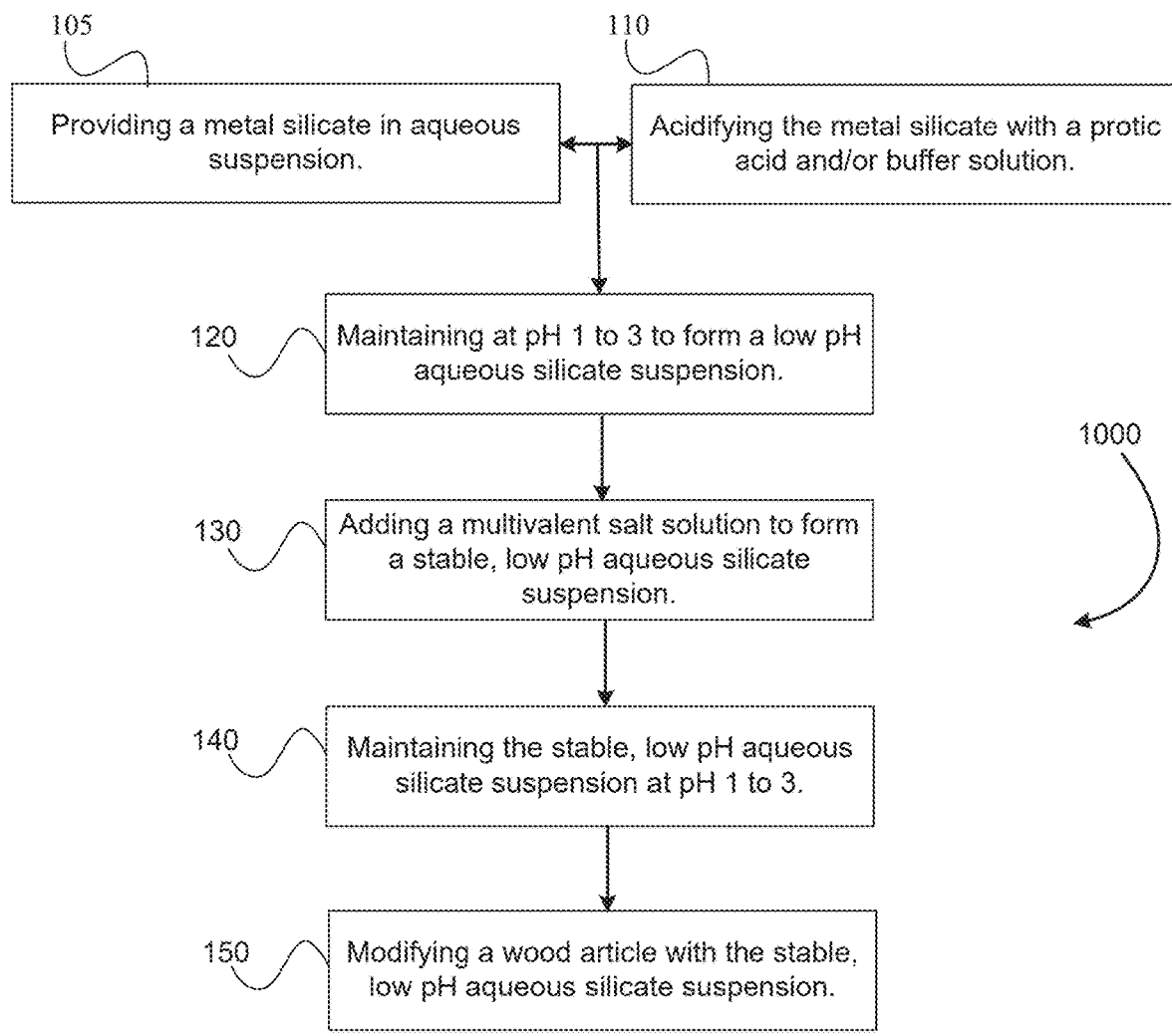
FIG. 1 is a flow chart showing a process for preparing a stable, low pH aqueous silicate suspension in accordance with one embodiment of the invention.

Aspects of the invention relate to a stable, low pH aqueous silicate suspension, process(es) for preparing a stable, low pH aqueous silicate suspension, and process(es) for modifying wood with a stable, low pH aqueous silicate suspension.

The stable, low pH aqueous silicate suspension (and processes) described herein provides for deep penetration into wood articles. In particular, the stable, low pH aqueous silicate suspension herein has been unexpectedly found to penetrate dense and/or hard-to-impregnate wood to an increased depth of impregnation of silicate into the wood articles, as compared with conventional silicate formulations and methods.

The inventors solved the problem of previous suspensions, which gel or precipitate too readily. The inventors found unexpectedly that a synergistic combination of a silicate salt suspension (lowered in pH via a protic acid and/or a buffering acid) with a multivalent salt solution, results in suspensions having an extended time to gelation and a deeper penetration into the wood can be realized leading to increased moisture resistance. Wood articles modified using the stable, low pH aqueous silicate suspension and processes described herein may be suitable for outdoor use due to the improved moisture resistance. Previously, wood lumber treated with conventional silicate based formulations could only be used for indoor use due to the inadequate resistance to weathering/environmental effects.

Unless defined otherwise, all technical and scientific terms used herein have the same meaning as is commonly understood by one of skill in the art to which this disclosure belongs. As used in the specification and claims, the singular forms "a," "an" and "the" include plural references unless the context clearly dictates otherwise.

The process steps described herein refer to temperatures, and, unless provided for, this refers to the temperature attained by the material that is referenced, rather than the temperature at which the heat source (e.g. furnace, oven) is set. The term "room temperature" refers to a range from 20° C. to 25° C. (68° F. to 77° F.).

The term "about" can be used to include any numerical value that can vary without changing the basic function of that value. When used with a range, "about" also discloses the range defined by the absolute values of the two endpoints, e.g. "about 2 to about 4" also discloses the range "from 2 to 4." The term "about" may refer to plus or minus 10% of the indicated number.

The embodiments of the invention and the various features and advantages thereto are more fully explained with references to the non-limiting embodiments and examples that are described and set forth in the following descriptions of those examples. Descriptions of well-known components and techniques are omitted to avoid obscuring the invention.

Stable, Low pH Aqueous Silicate Suspension for Impregnating Wood.

As described herein, a wood article is modified by a metal silicate solution (e.g., by soaking the wood, coating the wood, or vacuum-pressure impregnation, with an aqueous solution of metal silicate) to move into the interstices of the wood. The wood article may be structural wood such as (but not limited to) lumber such as "2×4's" and related and/or engineered wood such as plywood, oriented strand board (OSB), fiberboard, cross laminated timber, and related articles.

The disclosure provides a stable, low pH aqueous silicate suspension and process to modify wood articles with the suspension for deeper penetration of the silicate into the wood. In particular, the stable, low pH aqueous silicate suspensions herein delay and/or prevent gelation onset associated with conventional basic silicate formulations e.g., having pH 10-12. This is done by controlling the pH of the suspension and maintaining the pH in a range from about 1 to about 3.

Increasing the depth of impregnation of the silicate into a wood article during vacuum pressure impregnation using the stable, low pH aqueous silicate suspension herein is further enhanced by employing optimized solids loadings of the silicate in suspension. To cure the wood article, the pH may be neutralized. The deeper impregnation, pH control, and cure processes provide a wood article having improved moisture resistance, flame retardation, as well as resistance to insect, fungal and microbial attack.

One aspect of this invention relates to preparing a stable, low pH aqueous silicate suspension. The low pH suspension extends gelation time for the aqueous metal silicate. Preparing the stable, low pH aqueous silicate suspension may include rapidly combining a silicate suspension having known concentration (solids loading) and a relatively high pH (e.g., pH 10 or higher) with a rapidly stirred solution of a protic acid and/or buffering acid to effect a mixture having a pH between about 2 and about 3. Without being bound by theory, the colloidal suspension including various states of aggregation of the silicate ions is brought to a region of increased stability at the lower pH region.

As starting material for preparing the stable, low pH aqueous silicate suspensions herein, the metal silicate may include an alkali metal (or alkaline earth metal) silicate. Suitable metal silicates used in embodiments herein include sodium silicate, potassium silicate, or lithium silicate. The metal silicate may include sodium, potassium, or lithium as the metal counter ion. In embodiments, the metal silicate counterion is selected from: sodium, potassium, lithium, and combinations thereof.

Typically, the alkali metal silicate is sodium silicate or potassium silicate. In preferred embodiments, the (starting) alkali metal silicate is sodium silicate suspension, also known as "waterglass". The alkali metal silicates in aqueous suspension exhibit colloidal suspension behavior and are referred to as suspensions herein, and may also be referred also to as "aqueous solutions" or as a "metal silicate having a solution concentration".

In some embodiments, the metal silicate for preparing stable, low pH aqueous silicate suspension has a solution concentration of from about 1.5 wt % to about 55 wt %. The solution concentration is also referred to herein as "silicate solids" or "solids loading". The metal silicate for preparing the stable, low pH aqueous silicate suspension can, for example, have a solution concentration in a range of from 1.5 wt % to 55 wt %, e.g., from 5 wt % to 52 wt %, from 8 wt % to 50 wt %, from 10 wt % to 45 wt %, or from 12 wt % to 40 wt %. In terms of upper limits, the metal silicate solution concentration may be less than or equal to 55 wt %, e.g., less than or equal to 52 wt %, less than or equal to 50 wt %, less than or equal to 45 wt %, or less than or equal to 40 wt %. In terms of lower limits, the metal silicate solution concentration may be greater than or equal to 1.5 wt %, e.g., greater than or equal to 5 wt %, greater than or equal to 8 wt %, greater than or equal to 10 wt %, or greater than or equal to 12 wt %. In preferred embodiments, the metal silicate solution concentration is about 12 wt %. In some embodiments, the metal silicate solution concentration is about 52 wt %, which can be diluted later as required during the manufacturing process. These ranges and limits (as well as other ranges and limits described herein) may be applicable to processes including these suspensions as well. The solution concentrations or solids loadings in the final stable, low pH aqueous silicate suspension as prepared may be between about 5 wt % to about 9 wt %. This is because the starting solution concentration is diluted by the addition of the further solutions (e.g., protic acid and/or buffering acid solution and multivalent solution).

Regarding modulus, the metal silicate can, for example, have a modulus of from about 1.8 to about 4.0. The modulus, as relates to sodium silicates, is a weight ratio according to:

$$\frac{SiO_2}{Na_2O}.$$

The metal silicate may have a modulus in a range of from 1.8 to 4.0, e.g., from 2.0 to 4.0, from 2.2 to 3.8, or from 2.4 to 3.5. In terms of upper limits, the metal silicate modulus may be less than or equal to 4.0, e.g., less than or equal to 3.8, or less than or equal to 3.5. In terms of lower limits, the metal silicate modulus may be greater than or equal to 1.8, e.g., greater than or equal to 2.0, or greater than or equal to 2.2, or greater than or equal to 2.4. In preferred embodiments where the metal silicate is sodium silicate, the weight ratio (modulus) of $(SiO_2)/(Na_2O)$ of the metal silicate is about 2.7.

At least one of a protic acid solution and a buffering acid solution is combined with the alkali metal (or alkaline earth metal) silicate as described above to lower the pH of the suspension to a pH of about pH 3.0 or less, e.g., preferably between about pH 0.5 and about pH 3.0 or between about pH 1.0 and about pH 3.0. In some embodiments, a protic acid solution is stirred into the metal silicate suspension. In other embodiments, the metal silicate suspension is stirred into a buffering acid solution. Yet other embodiments include both solutions of a protic acid and a buffering acid to be combined with the metal silicate suspension. The amount of solution(s) (of protic acid and/or buffering acid) for combining with the metal silicate should be an amount effective to acidify the metal silicate (in aqueous suspension) to pH 3.0 or less. In certain embodiments, the metal silicate is acidified to a pH of between pH 0.5 and pH 3.0, or to a pH between pH 1.0 and pH 3.0.

Suitable protic acids for the preparation of stable, low pH aqueous silicate suspensions herein may include sulfuric acid ($H_2SO_4$), acetic acid ($CH_3COOH$), phosphoric acid ($H_3PO_4$), hydrochloric acid (HCl). In some embodiments, a protic acid may be selected from: sulfuric acid ($H_2SO_4$), acetic acid ($CH_3COOH$), phosphoric acid ($H_3PO_4$), hydrochloric acid (HCl), and combinations thereof. Suitable buffering acids for the preparation of stable, low pH aqueous silicate suspensions herein may include phosphoric acid or sulfuric acid. In a preferred embodiment, the buffering acid solution is phosphoric acid in a solution concentration of 20 wt % and having a pH of about 0.3. After incorporating the protic acid and/or buffering acid solution, the low pH metal silicate suspension has a pH of 3.0 or less. The pH may be between about pH 0.5 and about pH 3.0, or about pH 1.0 and about pH 3.0. In some preferred embodiments, the pH of the low pH metal silicate suspension is about 2.0.

As gelation time may be influenced by the starting concentration of the metal silicate, it is noted that concentrations of commercially available silicate salts typically can be as high as approximately 52% total solids, which may be diluted to lower levels as deemed suitable. With respect to pH, at pH 10 or higher the metal silicate at a particular solution concentration may be considered as totally soluble. As the suspension is lowered to a pH of from 7 to 8, it may be seen that the solubility decreases leading to gelation of the solution. This gelation occurs most rapidly between a pH of from 7 to 8 but may be further observed to be slower at a pH of from 2 to 3, with the gelation increasing again the pH is further lowered. The combination of the metal silicate with the protic acid and/or buffering acid targets this region of slower or delayed gelation.

Further to the above combination of metal silicate with the protic acid and/or buffering acid as described above, a multivalent metal salt is then added to prepare the stable, low pH aqueous silicate suspension as disclosed. The multivalent salt contains a Lewis acid such as, but not limited, to calcium+2 ($Ca^{+2}$), magnesium+2 ($Mg^{+2}$), and/or aluminum+3 ($Al^{+3}$). Previously, these multivalent metal salts were known to form strong complexes with sodium silicate solution at pH 10 resulting in the combination to then rapidly precipitate as gels or solid precipitates.

Surprisingly, contrary to the rapid solidification expected, adding a multivalent (Lewis acid) metal salt after forming a metal silicate suspension as above, which is first acidified (lowering the pH from about 10 to about pH 2 to pH 3 by combining with the protic acid and/or buffering acid) had unique effects on the stability of the overall suspension. The effect of the multivalent metal salt addition was to not only delay gelation (contrary to addition of Lewis acid to a sodium silicate alone), but the combination of all three (metal silicate, protic acid and/or buffering acid, and multivalent metal salt) slowed gelation even further than with the protic acid and/or buffering acid alone to the metal silicate alone.

This unexpected result gave rise to the idea that by controlling the pH and further delaying gelation with the synergistic combination of metal silicate, protic acid and/or buffering acid, and a Lewis acid to form the stable, low pH aqueous silicate suspension herein, a greater depth of impregnation into a wood article could be realized due to the unique behavior of the suspension. This unique behavior includes that the silicate remains in suspension and does not precipitate out until after impregnation into a wood article as discussed below. The resultant suspension was unexpectedly stable allowing for ease in adapting to manufacturing scale operations. Thus, greater depth of impregnation of the stable, low pH aqueous silicate suspension into wood articles could be reproducibly realized.

Multivalent metal salts suitable for combining with the low pH metal alkali suspension (including the metal silicate and at least one of a protic acid solution and a buffering acid solution as described above to lower the pH of the suspension to pH 3.0 or less) to form the stable, low pH aqueous silicate suspension as described herein include zinc chloride ($ZnCl_2$), magnesium sulfate ($MgSO_4$), and/or calcium chloride ($CaCl_2$)). In some embodiments, the multivalent metal salt is selected from: zinc chloride ($ZnCl_2$), magnesium sulfate ($MgSO_4$), calcium chloride ($CaCl_2$)), and combinations thereof. In a preferred embodiment, the multivalent metal salt is aluminum sulfate ($Al_2(SO_4)_3$).

The multivalent metal salt for preparing the stable, low pH aqueous silicate suspension can, for example, have a solution concentration in a range of from 5 wt % to 30 wt %, e.g., from 5 wt % to 25 wt %, from 10 wt % to 25 wt %, from 15 wt % to 30 wt %, from 10 wt % to 20 wt %, or from 11 wt % to 15 wt %. In terms of upper limits, the multivalent metal salt solution concentration may be less than or equal to 30 wt %, e.g., less than or equal to 25 wt %, less than or equal to 20 wt % or less than or equal to 15 wt %. In terms of lower limits, the multivalent metal salt solution concentration may be greater than or equal to 5 wt %, e.g., greater than or equal to 10 wt %, greater than or equal to 11 wt % or greater than or equal to 15 wt %. In preferred embodiments, the multivalent metal salt solution concentration is from about 11 wt % to about 15 wt %.

In embodiments herein, the stable, low pH aqueous silicate suspension has a pH of less than 3.0, e.g., between pH 0.5 and pH 3.0 or between pH 1.0 and pH 3.0.

In one embodiment, the stable, low pH aqueous silicate suspension comprises:
  i. a metal silicate having a solution concentration of from about 1.5 wt % to about 52 wt % and characterized by a modulus $$\frac{SiO_2}{Na_2O},$$

of from about 1.8 to about 4.0;
  ii. at least one of a protic acid solution and a buffering acid solution in an amount effective to acidify the metal silicate to a pH of about pH 3.0 or less, preferably between about pH 1.0 and about pH 3.0; and
  iii. a multivalent metal salt having a solution concentration from about 5 wt % to about 30 wt %.

The suspension has a pH of about 3.0 or less.

In another embodiment, the stable, low pH aqueous silicate suspension consists of:

i. a metal silicate having a solution concentration of from about 1.5 wt % to about 52 wt % and characterized by a modulus

of from about 1.8 to about 4.0;

ii. at least one of a protic acid solution and a buffering acid solution in an amount effective to acidify the metal silicate to a pH of about pH 3.0 or less, preferably between about pH 1.0 and about pH 3.0; and iii. a multivalent metal salt having a solution concentration from about 5 wt % to about 30 wt %.

The suspension has a pH of about 3.0 or less.

The stable, low pH aqueous silicate suspension for impregnating a wood article can include, in certain embodiments, wherein each of (i), (ii), and (iii) above are present in about equal volume.

FIG. 1 is a flow chart showing a process for preparing a stable, low pH aqueous silicate suspension in accordance with one aspect of the invention. Process 1000 includes providing a metal silicate in aqueous suspension as in step 105 of FIG. 1. The metal silicate may be in a solution concentration of from about 1.5 wt % to about 52 wt % and have a modulus of from about 1.8 to about 4.0 as described above. The metal silicate of step 105 is stirred rapidly with at least one of a protic acid solution and a buffering acid solution as in step 110 to acidify the metal silicate in suspension to effect a lower pH that is in the range from about pH 1.0 to about pH 3.0.

The resultant combination of metal silicate with the protic acid and/or buffering acid is maintained at the pH of from 1.0 to pH 3.0 at step 120 to form a low pH silicate suspension. The pH is maintain by adding either further metal silicate (as in 105) to increase the pH or by adding further protic acid and/or buffering solution (as in 110) as needed to decrease the pH to target pH level.

To the combination of metal silicate with the protic acid and/or buffering acid maintained at a pH of from 1.0 to pH 3.0 as in step 120, a multivalent salt solution is added at step 130 to form the stable, low pH aqueous silicate suspension maintained at a pH of from 1.0 to pH 3.0 as in step 140. The stable, low pH aqueous silicate suspension may then be used to modify a wood article at step 150.

Modified Wood Articles Having Increased Depth of Impregnation.

Figure 2A:
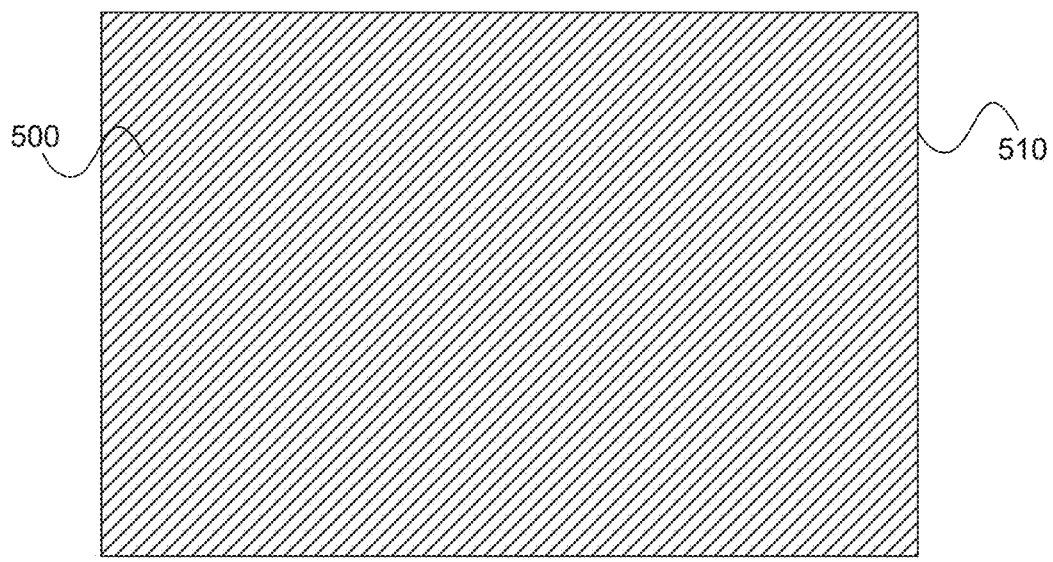
FIG. 2A is a schematic showing a cross section of an unmodified wood article.
Figure 2B:
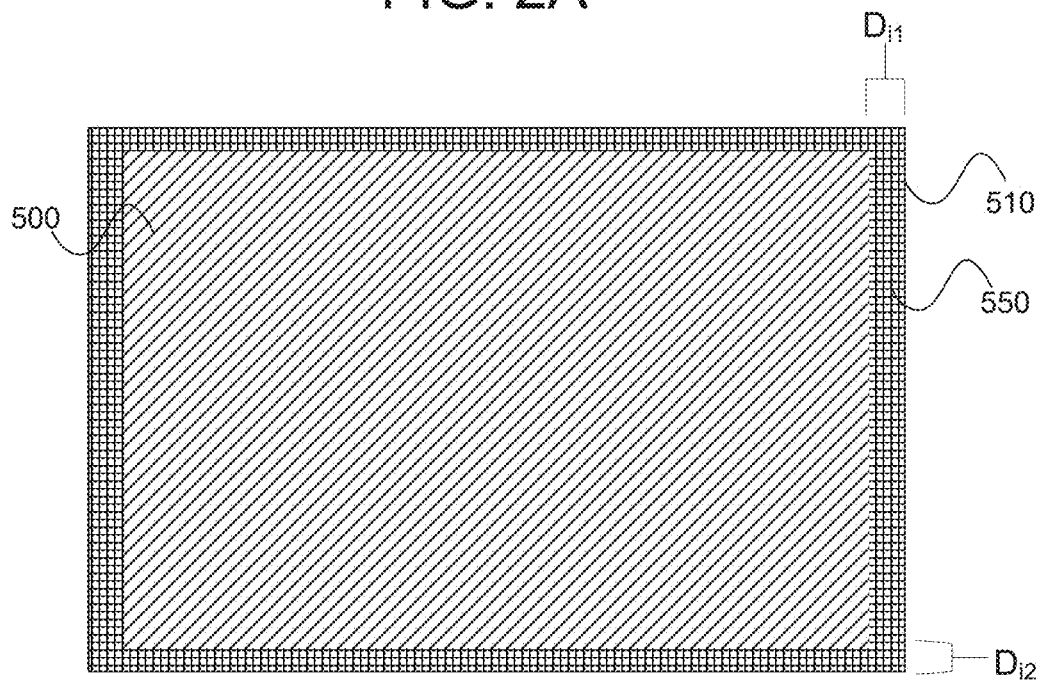
FIG. 2B is a schematic showing a cross section of the wood article as in FIG. 2A impregnated with a stable, low pH aqueous silicate suspension in accordance with one embodiment of the invention.

The stable, low pH aqueous silicate suspension as described above is used to modify a wood article. Referring to FIGS. 2A and 2B illustrating wood article 500, wood article 500 has outer surface 510. FIG. 2A shows an unmodified wood article with a vasculature of vessel elements, or pores. FIG. 2B shows wood article 500 after being impregnated with a stable, low pH aqueous silicate suspension according to the invention. The depth of impregnation of the suspension is measured radially inward from outer surface 510. The depth of penetration can vary depending upon the vasculature of the wood article. In some embodiments, the wood article is characterized by a depth of impregnation, $D_{i1}$, in a horizontal direction and another depth of impregnation, $D_{i2}$, in a vertical direction, as shown in FIG. 2B. The depth of impregnation is determined by X-ray fluorescence (XRF), which analyzes the elemental composition of the wood article. Specifically XRF detects the presence of silicon to determine the depth of impregnation. Samples referred to are prepared based on the Forstner bit method, AWPA Method A-51-1, a standardized procedure used by the American Wood Protection Association (AWPA) for preparing wood samples for "preservative treatment testing".

Wood articles impregnated with any of the stable, low pH aqueous silicate suspensions as described herein may demonstrate a depth of impregnation greater than that of a comparative wood article impregnated with a conventional metal silicate alone (without synergistically combining with a protic acid/buffer acid and a multivalent metal salt as in the disclosed suspension), where the depth of impregnation is determined by XRF measurement of silicon based on the Forstner bit method, AWPA Method A-51-1.

A wood article having a plurality of interconnected pores and an outer surface 510 (as in FIG. 2A) upon impregnation with the stable, low pH aqueous silicate suspension forms an interconnected solid (550 as in FIG. 2B) extending radially inward from the outer surface 510 to a first distance, e.g., Dit and/or $D_{i2}$. The interconnected solid 550 comprises a plurality of precipitated silicate particles at least partially impregnated within the interconnected pores. The wood article modified by the suspension may further include the interconnected solid enveloping the outer surface 510. Embodiments herein include where the interconnected solid is formed by impregnating the wood article with the stable, low pH aqueous silicate suspension as described, wherein the first distance is greater than that of a comparative wood article impregnated with a metal silicate alone.

Processes for Impregnating Wood with Stable, Low pH Aqueous Silicate Suspensions.

Figure 3:
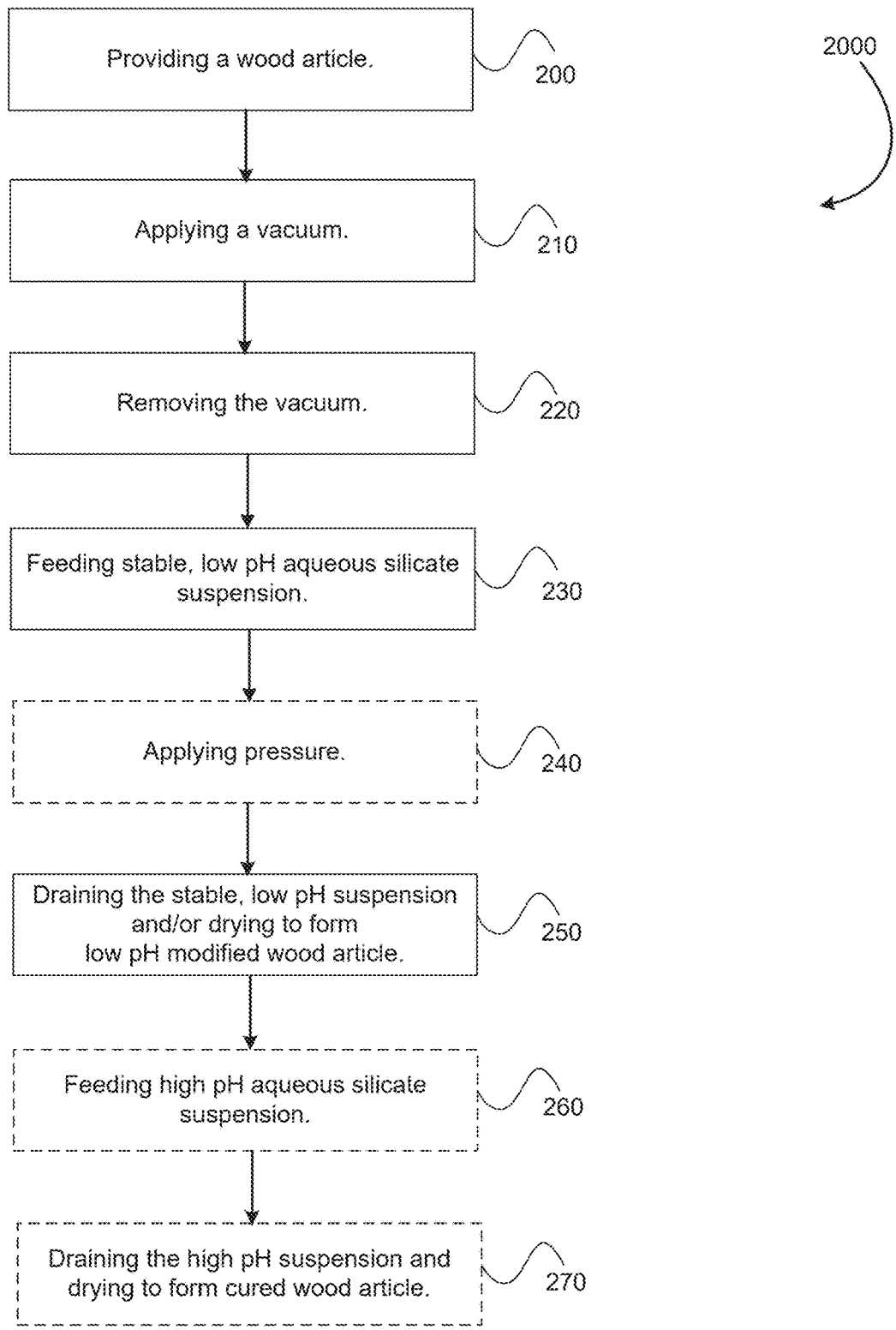
FIG. 3 is a flow chart showing a process for modifying a wood article with a stable, low pH aqueous silicate suspension in accordance with one embodiment of the invention.

FIG. 3 is a flow chart illustrating a process for modifying a wood article with a stable, low pH aqueous silicate suspension (as described above). The process 2000 for treating a wood article includes providing a wood article at step 200. A suitable reactor or pressure vessel may be used to house the wood article and the following steps may take place in said reactor or separately in more than one reactor. At step 210, the process includes applying a vacuum to the wood article. The vacuum attained in the reactor is about 1000 Pa to about 4000 Pa followed by removing the vacuum at step 220. In a preferred embodiment, the vacuum is about 3000 Pa to about 4000 Pa. The stable, low pH aqueous silicate suspension is introduced into the reactor by feeding the into the reactor at step 230. The stable, low pH aqueous silicate suspension is maintained at a temperature from about 20° C. to about 90° C. In a preferred embodiment, the stable, low pH aqueous silicate suspension is maintained at a temperature of about 50° C.

At step 240, the process includes applying pressure to assist in the impregnation of the stable, low pH aqueous silicate suspension into the wood article. Applying pressure may include a pressure range from about 276 kPa (40 psi) to about 1379 kPa (200 psi), e.g., from 276 kPa (40 psi) to 1379 kPa (200 psi), or from 552 kPa (80 psi) to 1103 kPa (160 psi). In a preferred embodiment, applying pressure includes a pressure of about 827 kPa (120 psi). Applying pressure may include a time of from about 15 minutes to about 300 minutes, e.g., from 15 minutes to 300 minutes, from 30 minutes to 180 minutes, or from 60 minutes to 120 minutes. In a preferred embodiment, applying pressure at step 240 includes for a time of about 90 minutes.

Alternatively, because the stable, low pH aqueous silicate suspension is uniquely stable, it is also contemplated that process 2000 may omit step 240, i.e., applying pressure at step 240 is optional. Modifying a wood article with the stable, low pH aqueous silicate suspension may include where the wood article is immersed in the suspension without the aid of applying pressure. For example, the wood article may be immersed in the suspension for a time of from about 15 minutes to about 300 minutes (or longer), e.g., from 15 minutes to 300 minutes, from 30 minutes to 180 minutes, or from 60 minutes to 120 minutes. In a preferred embodiment, immersing the wood article in the suspension (as an alternative to step 240) includes for a time of about 90 minutes.

The resultant low pH modified wood article is penetrated to a first depth with the stable, low pH aqueous silicate suspension at step 240. Thus, a solid impregnate to a first depth of impregnation from the surface of the wood article is formed. Draining the suspension from the reactor and/or drying the modified wood article may be performed to form a cured wood article. Further processing of the low pH modified wood article may be performed without drying at step 250. Drying, if included, at step 250 to form a low pH modified wood article includes drying at a temperature from about 30° C. to about 90° C., e.g., from 30° C. to 90° C., from 60° C. to 85° C., or from 75° C. to 80° C.

Optionally, process 2000 further includes further processing of the wood article, e.g., modifying and/or curing the wood article. Optional step 260 includes feeding a second suspension, wherein the second suspension is a high pH aqueous silicate suspension (e.g., a conventional silicate suspension having a pH of about 10 to about 11). Feeding at step 260 raises the pH of the impregnate formed within the wood article by the first suspension (the stable, low pH aqueous silicate suspension) to a pH of between about 6.0 and about 8.0, e.g., between about 7.0 and 8.0. Alternatively, step 260 may include feeding a mild base such as carbon dioxide, sodium bicarbonate, sodium carbonate, and the like. In one embodiment, the process includes (after step 250) feeding with a mild base selected from: carbon dioxide, sodium bicarbonate, sodium carbonate, and combinations thereof. Step 270 includes draining the high pH suspension and drying to form a neutralized, cured wood article. Alternatively, step 270 may include draining the mild base and drying to form the neutralized, cured wood article.

Process 2000 may comprise additional or alternative steps. For example, the process may include (after step 250) feeding a second suspension (e.g., a stable, low pH aqueous silicate suspension having same or different solution concentration) to form a second impregnate. In one embodiment, the second impregnate is formed from a metal silicate having a solution concentration of about 12 wt % to about 40 wt % and a modulus of from about 2 to about 4. Subsequent to feeding a second suspension as in this paragraph, the process may include steps such 260 and 270 as described above.

Process 2000 may further include exposing the dried low pH modified wood article (as in step 250) to a protic acid, a Lewis acid, a multivalent metal salt, solutions thereof, and/or combinations thereof. The protic acid (or solution thereof) may be selected from sulfuric acid ($H_2SO_4$), acetic acid ($CH_3COOH$), phosphoric acid ($H_3PO_4$), hydrochloric acid (HCl), and combinations thereof. The Lewis acid (or solution thereof) may be selected from zinc chloride ($ZnCl_2$), magnesium sulfate ($MgSO_4$), calcium chloride ($CaCl_2$), and combinations thereof. The multivalent metal salt (or solution thereof) may be aluminum sulfate ($Al_2(SO_4)_3$).

The process may include exposing the low pH modified wood article (as in step 250) to a curing agent, where the curing agent is selected from: a multivalent metal salt, a molecule containing organic moieties and multivalent metals, a protic acid, a multi-functional silane molecule, and combinations thereof.

In another aspect, processes herein may include penetrating wood with a delayed gelling colloidal silicate suspension, e.g., the stable, low pH aqueous silicate suspension as described above. This process may include preparing the colloidal silicate suspension (as in FIG. 1) and penetrating a wood article with the delayed gelling colloidal suspension to form a wood composite to a impregnation depth, Di and/or Diz, as in FIG. 2B.

Wood Articles

Wood articles suitable for treatment with any of the stable, low pH suspensions described above, or by any of the processes described above, should not limited by the examples herein. Wood articles suitable in the present disclosure may be selected from: a lumber, a lumber board, a lumber pole, a laminated lumber, a single plate laminate, a plywood, an oriented strand board (OSB), a particle board, a fiber board, and combinations thereof.

In certain embodiments, the wood article is lumber, lumber board, lumber pole, laminated lumber, single plate laminate, plywood, particle board, fiber board, or combinations thereof. The lumber may be any softwood or coniferous species such as southern yellow pine, radiata pine (pinus radiata), hemlock, or fir, for example. Surprisingly, it has been found that the suspensions and/or processes herein are especially effective for dense or hardwood, e.g., douglas fir, spruce, and the like.

In certain embodiments, the treated wood article (or wood product) is inert, rot resistant, fire resistant, termite resistant, bacteria resistant, and/or fungus resistant.

The resulting products are inert, namely, neither chemically nor biologically reactive and will not decompose, rot resistant, fire resistant, termite resistant, bacteria resistant, and/or fungus resistant, and with superior strength properties as compared to nonimpregnated stabilized lumber, resulting in extended lifetimes. The resulting products are also non-toxic and entirely environmentally safe. Lumber for residential and commercial construction, railroads (for railway ties) and phone and electric utilities (for utility poles) and other applications, may be made in accordance with the disclosed processes. In some examples, significant carbon sequestration is provided.

Additional Components

The stable, low pH aqueous silicate suspensions and processes described herein may synergistically work well with the other components for modifying wood. Adhesives, e.g., as described in WO 2024/118558, may be used additionally in the processes herein.

In some embodiments, the stable, low pH aqueous silicate suspensions (and treated wood articles produced therefrom) advantageously comprise little or no content of processing aids or additives, such as surfactants, coupling agents, lubricants, impact modifiers, plasticizers, colorants, or glass. Adding these components to silicate suspensions would only add additional cost and complicate processing for little or no benefit.

Some of these components mentioned herein, in some cases, may be considered optional. In some cases, the disclosed compositions may expressly exclude one or more of the aforementioned components in this section, e.g., via claim language. For example claim language may be modified to recite that the disclosed suspensions, processes, etc., do not utilize or comprise one or more of the aforementioned components, e.g., the suspensions do not include an adhesive.

INDUSTRIAL APPLICABILITY

Figure 4:
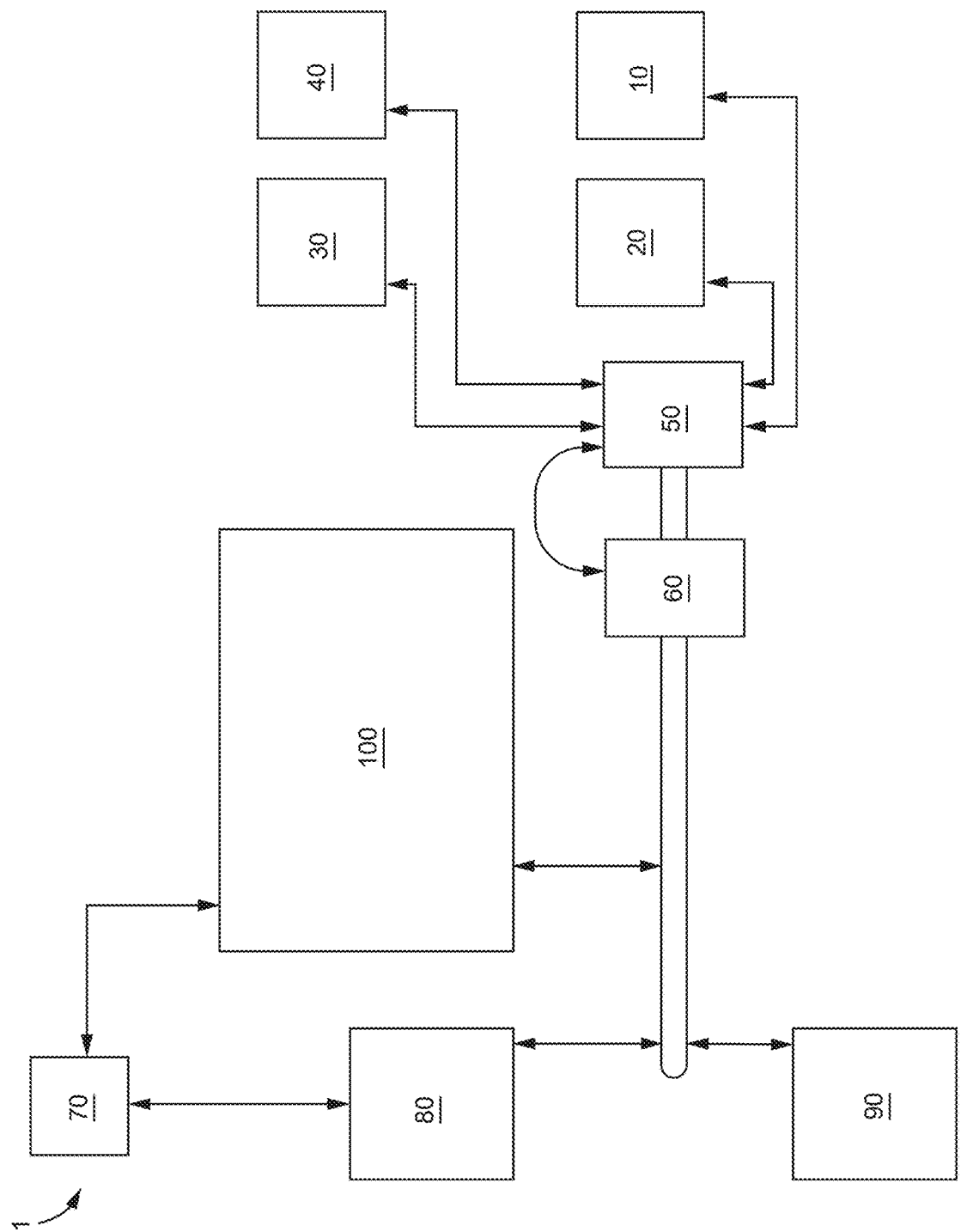
FIG. 4 is a system chart showing a manufacturing process for modifying a wood article with a stable, low pH aqueous silicate suspension in accordance with one embodiment of the invention.

The processes including the stable, low pH aqueous silicate suspension described herein may be scaled up to manufacturing/industrial applications for efficiency of resources and materials, as well as cost savings. In one embodiment, FIG. 4 is a flow chart showing a manufacturing process, system 1, for modifying a wood article with a stable, low pH aqueous silicate suspension 10 from the dispense system 50 to the pressure vessel 100 as in one embodiment. The manufacturing process includes the following elements:
10 aqueous silicate suspension
20 protic acid and/or buffering acid in solution
30 multivalent metal salt in solution
40 water
50 dispense system
60 solution monitoring feedback system
70 vacuum system/mechanical pumping system
80 combo cylinder
90 recycle tank
100 pressure vessel System 1 as in FIG. 4 includes where the dispense system 50 is for feeding stable, low pH aqueous silicate suspension (105 as in FIG. 1) to the pressure vessel 100 (e.g., a reactor for providing a wood article as in step 200 of FIG. 3). Solution monitoring feedback system 60 is for determining and controlling pH so that the stable, low pH aqueous silicate suspension feeding into pressure vessel 100 is at a pH of from 1 to 3. Combo cylinder 80 is a reservoir for pressure vessel 100. As the wood article(s) in pressure vessel 100 absorb the stable, low pH aqueous silicate suspension, the combo cylinder 80 replenishes suspension into the pressure vessel 100. The recycle tank 90 collects any drained or excess suspension as needed from system 1.

The examples used herein are intended merely to facilitate an understanding of ways in which the invention may be practiced and to further enable those skilled in the art to practice the invention. Accordingly, the examples and embodiments set forth herein should not be construed as limiting the scope of the invention, which is defined by the claims.

EXAMPLES

The following examples are for illustrative purposes only and are not intended to limit, in any way, the scope of the present invention.

Example 1: Gel Time (Precipitate Formation) of a 12 wt % Solids Suspension with Protic Acid Additions at Varying Concentrations Phosphoric acid was added as protic acid to lower the pH of the sodium silicate suspension. Gel times indicating the formation of precipitated silicate out of suspension were determined as a function of phosphoric acid concentration wherein the suspension reaches a target pH value of about 2.

A 12% solids sodium silicate suspension of known volume and mass was stirred rapidly by an overhead stirrer. The pH value of the starting sodium silicate suspension was pH 10-11. Rapidly added to the suspension was an equal volume of a solution of phosphoric acid in varying concentrations. The pH of each resultant suspension was measured. The suspension was then stirred until evidence of solid precipitate or gel formation (precipitated silicate) was observed. Table 1 below shows data for varying concentrations of phosphoric acid from 20% to 85% based on the weight of the acid relative to the total weight of the solution.

TABLE 1

Gel Time as a function of protic acid concentration for 12 wt % silicate solids.

| [$H_3PO_4$] | [$NaSiO_3$] | Gel Time/minutes |
|---|---|---|
| 85% | 12% | 10 |
| 42.5% | 12% | 720 |
| 20% | 12% | 1140 |
| 10.6% | 12% | 120 |
| 5.3% | 12% | 5 |

As demonstrated in Example 1, the addition of a protic acid to a sodium silicate suspension results in a gel like solid, frequently soft and swollen with water, to form an interconnected solid. The time required to do so varied as a function of pH, with the peak or longest gel time being 1140 minutes for a 20% phosphoric acid addition having a pH of 0.3. A preferred window of extended gel time was observed to be present at a pH value of between 1 and 3.

Example 2: Precipitate Formation of a 12 wt % Silicate Solids Suspension with Multi-Valent Lewis Acid Additions A 12% solids sodium silicate suspension of known volume and mass was stirred rapidly by an overhead stirrer. Rapidly added to the suspension was an equal volume of a solution of various concentrations of Lewis acids in solution ranging from 5 to 30 wt %. In all cases, immediate precipitation was observed. The table below shows the data for several Lewis acids at 20% concentration, which upon adding to the equal volume of sodium silicate suspension equals 10 wt %.

TABLE 2

Precipitation Formation with various Lewis Acids for 12 wt % silicate solids.

| Lewis acid 10 wt % | $NaSiO_3$/wt.% | Precipitate Formation |
|---|---|---|
| Calcium Chloride | 12% | yes |
| Aluminum Sulfate | 12% | yes |
| Magnesium Chloride | 12% | yes |
| Zinc Chloride | 12% | yes |

As demonstrated in Example 2, upon the addition of Lewis acids to the sodium silicate suspension, precipitated silicate was formed rapidly and immediately. This was in stark contrast to the effect of the protic acid addition as in Example 1, which has the effect to delay gelation/precipitation.

Example 3: Gel Time (Precipitate Formation) of a 12 wt % Silicate Solids Suspension with Additions of a Protic Acid Solution and a Lewis Acid Solution A suspension according to Example 1 was prepared having a pH of 1.5 with equal volumes of protic acid, a 20% phosphoric acid (1 l) solution, and 12% sodium silicate suspension (1 l). Upon the rapid addition of the protic acid, a small amount of solid was observed to form, which redissolved after several minutes. Rapidly added to the suspension was then 1 l of a 15 wt % aqueous solution of a multi-valent Lewis acid. Table 3 shows data for representative Lewis acids as added.

TABLE 3

Precipitation Formation with protic acid/Lewis Acids for 12 wt % silicate solids.

| Lewis Acid | Precipitate | Gel time/hrs |
|---|---|---|
| 15% $CaCl_2$ | No | 1140+ |
| 15% $AlSO_4 \cdot 7H_2O$ | No | 1140+ |
| 15% $ZnCl_2$ | No | Overnight |

As demonstrated in Table 3, it was surprisingly found that when the pH of the silicate suspension is lowered (with the protic acid solution) to the stability window of pH values of from 1 to 3, it is then possible to also add a solution of multi-valent Lewis acid to the silicate suspension to synergistically and advantageously extend the time to form precipitated silicate, the Lewis acid contributing to the stability of the suspension.

Previously it was expected that the addition of a multi-valent Lewis acid (as in Example 2) would lead to an instantaneous gel. As demonstrated in Example 3, the gel time was not only extended, but it was also extended to such a degree that would allow its use in typical industrial vacuum pressure impregnations. While Example 3 is shown using phosphoric acid as protic acid, it is contemplated that any protic acid capable of providing a pH of 3 or lower to the suspension may be used.

Also unexpectedly, it was observed that the order of addition as taught in Example 3 of first acidifying the silicate with the protic acid and then adding the Lewis acid salt solution was necessary. Example 3 required the addition of the Lewis acid solution to be after the mixing of the silicate suspension and protic acid.

Example 4: Reverse Addition of a High Silicate Solids Suspension to a Buffer Solution Maintained at a pH Value at 3 or Less To scale up from the lab to manufacturing capabilities, an alternative to the rapid acidifying as required with a protic acid (as in Examples 1 and 3) was sought. The alternative as in Example 4 used a buffer solution in place of a protic acid solution. Inline pH monitoring was used to maintain the pH of the sodium silicate suspension at pH 3 or below. pH control is affected by providing additional conjugate acid of the buffer and/or additional (basic) metal silicate suspension as needed. To reduce metal silicate volume requirements for manufacturing, the solids loading of the sodium silicate suspension was raised to 52 wt %, as compared to the 12 wt % silicate solids as in Example 1.

In Example 4, a phosphate buffer at a concentration of 85% phosphoric acid was prepared according to *European Pharmacopoeia* 7.0 (see, e.g., *European Pharmacopoeia* 7.0; publisher: Council of Europe: European Directorate for the Quality of Medicines and Healthcare, Strasbourg, section 4.1.3 "Buffer Solutions"). 100 g of the phosphate buffer was added to a 250 ml beaker and stirred rapidly with a magnetic stirrer. A 52 wt % sodium silicate suspension was then added dropwise with pH monitoring. After approximately each 0.5-1 ml addition of the sodium silicate suspension, the pH was measured using either a pH meter or pH paper. If the pH value in the beaker had drifted higher to a pH value of about 4, additional 85% phosphoric acid was then added to buffer the contents lower to a pH value of from 2 to 3. It was observed that for every 2 ml of sodium silicate suspension, an addition of 1 ml of concentrated (85% phosphoric acid) buffer was required to maintain the pH at desired levels. Sodium silicate suspension additions were added in amounts of about 3-12 wt % alternatingly with buffering until the buffered high concentration low pH sodium silicate suspension was prepared.

Suspensions prepared according to Example 4 were then combined with Lewis acid salt solutions (as in Example 3), which resulted in significantly increased gel times, similarly as for Example 3.

Example 5: Dilution of the Buffered High Silicate Solids to Provide Stable, Low pH Suspensions In Example 5, the buffered high concentration sodium silicate suspension (as in Example 4) was diluted to a concentration more typically used for wood impregnation, to a stable pH value of from 1.5 to 3, and combined with a Lewis acid. Aluminum sulfate hydrate was used as Lewis acid for Example 5.

According to Example 5, 25 g of a 52% sodium silicate suspension and 100 g of phosphate buffer (concentrated 85% phosphoric acid having a pH of 2) were quickly combined. The pH of the resultant suspension was measured to be about 9. Further additions of the phosphate buffer were made to lower the pH to from 1.5 to 3 (to match the pH of the starting phosphate buffer). To this buffered high silicate solids suspension was then added 200 g of a 20% (w:w) solution of aluminum sulfate hydrate to form a stable metal silicate suspension having a pH of from 1.5 to 3.

The stability of the suspensions prepared as in Examples 3-5 advantageously provide for a region of slow gelation at pH values of 1 to 3.

Example 6: Delaying of Gel Time with Stable, Low pH Aqueous Silicate Suspensions and Forming Unique Solid Structures The stable, low pH suspensions of the examples above provide for greater penetration and extended depths into wood due at least in part to extended gel times, which delay the formation precipitated silicate within the wood (the pores or vessels thereof) being impregnated. Example 6 provides further enhancement to the wood post reaction (forming precipitated silicate) by adjusting the final pH of the wood silicate composite. As shown in Example 6, the addition of a carbonate base such as $CO_2$ gas, or solutions of sodium bicarbonate, used to raise the pH to from 7 to 8 promotes gelation and a foam like morphology.

For Example 6, to 30 g of the stable, low pH suspension prepared according to Example 5 was added solid sodium bicarbonate (approximately 3 g) to which effusive bubbling occurred followed by thickening to form an interconnected solid. The interconnected solid was foam like in appearance.

The stable, low pH suspensions of Examples 3-5 formed gels over extended periods of time. Thus, the stable, low pH suspensions exemplified above, are ideally suited for use in industrial wood impregnation. The extended gel times allowed for achieving deeper penetration into the wood (for greater depth of impregnation). The addition of the carbonate as in Example 6 provided for a being able to shortened gel time "on demand" by raising the pH of the sodium silicate suspension (causing it to "crash") while, due to the foam like morphology of the solid, benefitted the overall density and insulation characteristics of the impregnation.

Example 7: Wood Impregnated with Stable, Low pH Aqueous Silicate Suspensions The examples above demonstrated stable, low pH aqueous silicate suspensions. Controlling the "collapse" of these stable suspensions (to form precipitated silicate deeply as a solid impregnate into wood) can be achieved by (a) altering/raising the suspension pH (to about pH of 7) as in Example 6 above. Other alternate routes include: (b) heating to a temperature up to 100° C. and/or (c) applying pressure.

Example 7 used a stable, low pH aqueous silicate suspension according to the invention in a low temperature, lab scale vacuum pressure impregnation process as to apply temperature and pressure. The stable, low pH sodium silicate suspension was prepared using the phosphate buffer solution to maintain the suspension at a pH value of from 2 to 3 (as in Example 4) to which a Lewis acid was added (as in Example 5).

In Example 7, 1"×1" wood samples (obtained from Pollard Lumber Co.; samples did not contain a heartwood region) were placed in a lab scale vacuum/pressure impregnation reactor. The wood samples were subjected to a mechanical pump vacuum for 30 to 45 minutes, followed by immersion in the stable, low pH aqueous silicate suspensions (approx. 5 wt. % silicate in the suspension) to impregnate the wood samples with the suspension. After several minutes the wood/silicate suspension was then raised to 414 kPa (60 psi) and maintained at this pressure for 1.5 hours after which time the pressure was removed and the remaining silicate suspension poured off. The wood samples were dried at from 75 to 85° C. overnight. Low pH silicate suspension samples (Samples 1 and 2) as well as high pH silicate suspensions (Samples CE-1 and CE-2) were prepared using the same silicate solids loading of from 5 to 6 wt %.

The wood samples were then analyzed by Xray fluorescence and shown to have been impregnated to 1.45% on the first 6.35 mm (0.25 inches) (short axis) and 0.99% 12.7 mm (0.50 inches) on the long axis. Untreated wood had XRF values of 0%. The XRF wood samples were prepared by the standardized procedure "Forstner" bit method described in AWPA (American Wood Protection Association) Method A-51-1.

TABLE 4

Depth of impregnation for stable, low pH aqueous silicate suspensions.

| Sample No. | Lewis Salt | % Depth into 0.25" wood | % Depth into 0.50" wood | Measurement Technique |
|---|---|---|---|---|
| 1 | $CaCl_2$ | 11.56 | 9.03 | XRF |
| 2 | None | 5.63 | 4.96 | XRF |

TABLE 5

Depth of impregnation for high pH silicate suspensions.

| Sample No. | Lewis Salt | % Depth into 0.25 in wood | % Depth into 0.50 in wood | Measurement Technique |
|---|---|---|---|---|
| CE-1 | None | 1.9 | 0.0 | XRF |
| CE-2 | None | 1.1 | 0.0 | XRF |

In an analysis of the wood impregnated with high pH silicate suspensions as in Table 5 using a stain indicator, no observable penetration of the suspension below the surface of the wood was detected.

Example 8: Wood Impregnated with Stable, Low pH Aqueous Silicate Suspensions Followed by an Additional Treatment The impregnation with stable, low pH aqueous silicate suspensions according to the invention may be used alone, or optionally in conjunction with an additional treatment. Such treatments may include impregnating with an additional low pH silicate suspension (of varying concentrations), with a high pH silicate suspension (of varying concentrations), or with an additional processing step(s) and/or component(s) such as acidic curing agents, dyes, and other colorants, as well as processing or performance additives such as (but not limited to) waxes, biocides, surfactants, polymeric additives and the like.

Example 8 used a subsequent impregnation after impregnation with the stable, low pH aqueous silicate suspension as in Example 7. The second impregnation for Example 8 used a high pH silicate suspension (pH=11 and modulus=2.7).

Samples were prepared as in Example 7 and used either after drying overnight or after oven drying. The samples were then subjected to a mechanical pump vacuum for 30-45 minutes, followed by immersion in the stable, low pH suspension (pH=3; 5 wt. % silicate solids). After several minutes, the wood sample impregnated with silicate suspension was subjected to a pressure raised to 414 kPa (60 psi) and this pressure was maintained for 1.5 hours, after which time the pressure was removed and the remaining low pH silicate suspension poured off. The wood samples were then dried at from 75° C. to 85° C. overnight.

The samples were then impregnated a second time, however the suspension used was a high pH sodium silicate suspension (pH 11). Vacuum impregnation parameters were the same for the stable, low pH aqueous silicate suspension. Example 8, in the second impregnation, was subjected to a pressure of 414 kPa (60 psi) and this pressure was maintained for 1.5 hours. The final pH of the wood article after the second impregnation was neutralized to about 7.8.

Further to the examples above, the stable, low pH aqueous silicate suspensions according to the invention were found to provide preferential depth of impregnation in vacuum pressure impregnation (VPI) even at reduced pressures of 276 kPa (40 psi) at room temperature. By creating a suspension in colloidal state at a low pH, which is also stable, has been found to slow the rate of gelation/formation of silicate precipitates. This "all-in-one" suspension for impregnation provides the benefit that once the impregnation is complete, the complete gelation may be obtained on standing with the pH remaining at the low pH value, e.g., pH of from 0.5 to 3.0, or from 1.0 to 2.0 or by alternatives, such as triggered to gel by exposure to $CO_2$ while wet or by the addition of sodium bicarbonate solution which also raises the pH to values of 6-8 depending on the exposure and reaction time.

The stable, low pH aqueous silicate suspensions taught here contain all the ingredients required for the impregnation and gelation of a wood article that previously required multiple processing steps. Further, the stable, low pH aqueous silicate suspensions are suitable for standard vacuum pressure impregnation techniques as well as opening streamlined processes.

The stable, low pH aqueous silicate suspensions described above have also been shown to require less elevation in temperature thereby offering both cost reductions as well as environmental friendliness improvements by lowering energy consumption. Conversely, should heating be desired for some applications, the higher ionic strength of the stable, low pH aqueous silicate suspensions may be expected to allow greater retention of the heat. In current processes where carbon dioxide is used to neutralize the modified wood article, this step could also be eliminated or be reduced. This is because carbon dioxide is not required as a curing agent or reactant but rather merely to "polish" the embedded solid impregnate to a value closer to a neutral pH or to a pH ranging from about 6 to about 8, preferably from about 6 to about 7.

Clauses

Clause 1. A stable, low pH aqueous silicate suspension for impregnating a wood article, the suspension comprising: (i) a metal silicate having a solution concentration of from about 1.5 wt % to about 52 wt % and characterized by a modulus, $$\frac{SiO_2}{Na_2O},$$

of from about 1.8 to about 4.0; (ii) at least one of a protic acid solution and a buffering acid solution in an amount effective to acidify the metal silicate to a pH of about 3.0 or less, preferably to a pH between about 1.0 and about 3.0; and (iii) a multivalent metal salt having a solution concentration from about 5 wt % to about 30 wt %; wherein the suspension has a pH of about 3.0 or less; and wherein the wood article has a depth of impregnation greater than that of a comparative wood article impregnated with (i) alone, the depth of impregnation determined by X-ray fluorescence measurement of silicon based on a Forstner bit method, American Wood Protection Association Method A-51-1.

Clause 2. suspension of clause 1, wherein the metal silicate has a solution concentration of from about 12 wt % to about 40 wt %.

Clause 3. The suspension of clause 1 or clause 2, wherein the multivalent metal salt has a solution concentration from about 15 wt % to about 30 wt %.

Clause 4. A modified wood composite comprising: a wood article having a plurality of interconnected pores and an outer surface; and an interconnected solid extending radially inward from the outer surface to a first distance, wherein the interconnected solid comprises a plurality of precipitated silicate particles at least partially impregnated within the plurality of interconnected pores; wherein the interconnected solid is formed by impregnating the wood article with the stable, low pH aqueous silicate suspension of Clause 1, and wherein the first distance is greater than that of a comparative wood article impregnated with (i) alone.

Clause 5. The modified wood composite of clause 4 further comprising the interconnected solid enveloping the outer surface.

Clause 6. A process for modifying a wood article, the process comprising: applying a vacuum to a wood article within a reactor to obtain a vacuum of about 1000 Pa to about 4000 Pa followed by removing the vacuum; feeding the reactor with the stable, low pH aqueous silicate suspension of Clause 1 maintained at a temperature from about 20° C. to about 90° C.; applying a first pressure from about 276 kPa (40 psi) to about 1379 kPa (200 psi) for about 15 minutes to 300 minutes to form a low pH modified wood article penetrated to a first depth with the stable, low pH aqueous silicate suspension to form an impregnate to a first depth of impregnation from an outer surface of the wood article, wherein the impregnate is solid.

Clause 7. The process of Clause 6 further comprising draining the reactor and/or drying the modified wood article at a temperature from about 30° C. to about 90° C. to form a dried low pH modified wood article.

Clause 8. The process of Clause 6 further comprising draining the reactor followed by introducing a mild base to raise the pH of the impregnate to a pH between about 6.0 and about 8.0, preferably to a pH between about 7.0 and about 8.0.

Clause 9. The process of Clause 6 further comprising a second feeding step to form a second impregnate, wherein the second impregnate is formed from a high pH metal silicate suspension comprising a metal silicate having a solution concentration of about 5 wt % to about 40 wt % and a modulus of from about 2 to about 4.

Clause 10. The process of Clause 9, wherein the high pH metal silicate suspension has a pH of from about pH 10 to about pH 11.

Clause 11. The process of Clause 6 further comprising exposing the low pH modified wood article to a protic acid, a Lewis acid, a multivalent metal salt, solutions thereof, and/or combinations thereof, wherein exposing includes at least one of: the protic acid or solution thereof, wherein the protic acid is selected from sulfuric acid, acetic acid, phosphoric acid, hydrochloric acid, and combinations thereof; the Lewis acid or solution thereof, wherein the Lewis acid is selected from zinc chloride, magnesium sulfate, calcium chloride, and combinations thereof; and the multivalent metal salt or solution thereof, wherein the multivalent metal salt is aluminum sulfate.

While the disclosure has been described in detail, modifications within the spirit and scope of the disclosure will be readily apparent to those of skill in the art. In view of the foregoing discussion, relevant knowledge in the art and references discussed above in connection with the Background and Detailed Description, the disclosures of which are all incorporated herein by reference. In addition, it should be understood that aspects of the disclosure and portions of various embodiments and various features recited below and/or in the appended claims may be combined or interchanged either in whole or in part. In the foregoing descriptions of the various embodiments, those embodiments which refer to another embodiment may be appropriately combined with other embodiments as will be appreciated by one of skill in the art. Furthermore, those of ordinary skill in the art will appreciate that the foregoing description is by way of example only, and is not intended to limit the disclosure.

What is claimed is:

1. A stable, low pH aqueous silicate suspension for impregnating a wood article, the suspension comprising:
   a metal silicate having a solution concentration of from about 1.5 wt % to about 52 wt % and characterized by a modulus of from about 1.8 to about 4.0 and at least one of a protic acid solution and a buffering acid solution in an amount effective to acidify the metal silicate to a pH of about 3.0 or less; and
   a multivalent metal salt having a solution concentration from about 5 wt % to about 30 wt %;
   wherein the metal silicate includes a metal counterion selected from sodium, potassium, lithium, and combinations thereof;

wherein the suspension has a pH of about 3.0 or less; and
wherein the wood article has a depth of impregnation greater than that of a comparative wood article impregnated with the metal silicate alone, the depth of impregnation determined by X-ray fluorescence measurement of silicon based on a Forstner bit method, American Wood Protection Association Method A-51-1.

2. The suspension of claim 1, wherein the metal silicate has a solution concentration of from about 12 wt % to about 40 wt %.

3. The suspension of claim 1, wherein the multivalent metal salt has a solution concentration from about 15 wt % to about 30 wt %.

4. A modified wood composite comprising:
a wood article having a plurality of interconnected pores and an outer surface; and
an interconnected solid extending radially inward from the outer surface to a first distance, wherein the interconnected solid comprises a plurality of precipitated silicate particles at least partially impregnated within the plurality of interconnected pores;
wherein the interconnected solid is formed by impregnating the wood article with the stable, low pH aqueous silicate suspension of claim 1, and wherein the first distance is greater than that of a comparative wood article impregnated with the metal silicate alone.

5. The modified wood composite of claim 4 further comprising the
interconnected solid enveloping the outer surface.

6. The suspension of claim 1, wherein the metal silicate has a modulus, $SiO_2/R_2O$, wherein R is a+1 metal selected from sodium, potassium, lithium, and combinations thereof.

7. The suspension of claim 1, wherein the metal silicate is sodium silicate and the modulus is $$\frac{SiO_2}{Na_2O}.$$

8. A stable, low pH aqueous silicate suspension for impregnating a wood article, the suspension comprising:
a sodium silicate having a solution concentration of from about 1.5 wt % to about 52 wt % and characterized by a modulus, $$\frac{SiO_2}{Na_2O},$$

of about 1.8 to about 4.0 and at least one of a protic acid solution and a buffering acid solution in an amount effective to acidify the metal silicate to a pH of about 3.0 or less; and
a multivalent metal salt having a solution concentration from about 5 wt % to about 30 wt %;
wherein the suspension has a pH of about 3.0 or less; and
wherein the wood article has a depth of impregnation greater than that of a comparative wood article impregnated with the sodium silicate alone, the depth of impregnation determined by X-ray fluorescence measurement of silicon based on a Forstner bit method, American Wood Protection Association Method A-51-1.

9. A process for modifying a wood article, the process comprising:
applying a vacuum to a wood article within a reactor to obtain a vacuum of about 1000 Pa to about 4000 Pa followed by removing the vacuum;
feeding the reactor with the stable, low pH aqueous silicate suspension of claim 1 maintained at a temperature from about 20° C. to about 90° C.;
applying a first pressure from about 276 kPa (40 psi) to about 1379 kPa (200 psi) for about 15 minutes to 300 minutes to form a low pH modified wood article penetrated to a first depth with the stable, low pH aqueous silicate suspension to form an impregnate to a first depth of impregnation from an outer surface of the wood article, wherein the impregnate is solid.

10. The process of claim 9 further comprising draining the reactor and/or drying the modified wood article at a temperature from about 30° C. to about 90° C. to form a dried low pH modified wood article.

11. The process of claim 9 further comprising draining the reactor followed by introducing a mild base to raise the pH of the impregnate to a pH between about 6.0 and about 8.0.

12. The process of claim 9 further comprising a second feeding step to form a second impregnate, wherein the second impregnate is formed from a high pH metal silicate suspension comprising a metal silicate having a solution concentration of about 5 wt % to about 40 wt % and a modulus of from about 2 to about 4.

13. The process of claim 12, wherein the high pH metal silicate suspension has a pH of from about pH 10 to about pH 11.

14. The process of claim 9 further comprising exposing the low pH modified wood article to a protic acid, a Lewis acid, a multivalent metal salt, solutions thereof, and/or combinations thereof, wherein exposing includes at least one of:
the protic acid or solution thereof, wherein the protic acid is selected from sulfuric acid, acetic acid, phosphoric acid, hydrochloric acid, and combinations thereof;
the Lewis acid or solution thereof, wherein the Lewis acid is selected from zinc chloride, magnesium sulfate, calcium chloride, and combinations thereof; and
the multivalent metal salt or solution thereof, wherein the multivalent metal salt is aluminum sulfate.

* * * * *